(12) United States Patent
Lee et al.

(10) Patent No.: US 7,018,739 B2
(45) Date of Patent: Mar. 28, 2006

(54) POSITIVE ACTIVE MATERIAL AND POSITIVE ACTIVE MATERIAL COMPOSITION FOR LITHIUM-SULFUR BATTERY AND METHOD OF PREPARING POSITIVE ACTIVE MATERIAL COMPOSITION

(75) Inventors: Jea-Woan Lee, Cheonan (KR); Seung-Hee Park, Pohang (KR)

(73) Assignee: Samsung SDI Co., Ltd., Suwon-si (KR)

( * ) Notice: Subject to any disclaimer, the term of this patent is extended or adjusted under 35 U.S.C. 154(b) by 267 days.

(21) Appl. No.: 10/156,796

(22) Filed: May 30, 2002

(65) Prior Publication Data
US 2003/0073000 A1 Apr. 17, 2003

(30) Foreign Application Priority Data
Oct. 17, 2001 (KR) ............... 2001-64096

(51) Int. Cl.
*H01M 4/62* (2006.01)
(52) U.S. Cl. .............. 429/217; 429/218.1; 429/231.8; 429/232; 429/212; 252/519.14; 252/519.4; 252/502; 252/512
(58) Field of Classification Search .......... 429/212, 429/213, 218.1, 217, 231.8, 232; 252/519.14, 252/519.4, 502, 512
See application file for complete search history.

(56) References Cited

U.S. PATENT DOCUMENTS

| 5,523,179 | A | * | 6/1996 | Chu .......................... 429/213 |
| 6,110,619 | A | * | 8/2000 | Zhang et al. ............... 429/213 |
| 6,194,099 | B1 | * | 2/2001 | Gernov et al. ............. 429/213 |
| 6,210,831 | B1 | * | 4/2001 | Gorkovenko et al. ....... 429/213 |
| 2002/0192557 | A1 | * | 12/2002 | Choi et al. .................. 429/232 |

FOREIGN PATENT DOCUMENTS

GB    1 411 270    10/1975

* cited by examiner

*Primary Examiner*—Laura Weiner
(74) *Attorney, Agent, or Firm*—Stein, McEwen & Bui, LLP

(57) ABSTRACT

The present invention relates to a positive active material for a lithium-sulfur battery and a method of preparing a positive active material composition comprising the same, and the positive active material includes a sulfur compound, a conductive agent adhered to the sulfur compound, and a binder including at least one polymer, which is positioned between the sulfur compound and the conductive agent to bind the conductive agent to the sulfur compound.

The capacity per active mass weight of the positive active material increases by 25 to 35%, and the positive active material has improved discharge potentials and discharge capacity at high rate.

16 Claims, 7 Drawing Sheets

POSITIVE ACTIVE MATERIAL AND POSITIVE ACTIVE MATERIAL COMPOSITION FOR LITHIUM-SULFUR BATTERY AND METHOD OF PREPARING POSITIVE ACTIVE MATERIAL COMPOSITION

CROSS REFERENCE TO RELATED APPLICATION

This application is based on and claims the benefit of Korean Patent Application No. 2001-64096, filed in the Korean Intellectual Property Office on Oct. 17, 2001, the disclosure of which is incorporated hereinto by reference.

BACKGROUND OF THE INVENTION

1. Field of the Invention

The present invention relates to a positive active material, a positive active material composition for a lithium-sulfur battery and a method of preparing the positive active material composition, and more particularly, to a positive active material for use in a lithium-sulfur battery having a high capacity, a positive active material composition and a method of preparing the positive active material composition.

2. Description of the Related Art

A positive electrode of a lithium-sulfur battery is generally prepared by mixing a sulfur compound as a positive active material, a conductive agent, and a binder in a solvent to prepare a slurry, and coating the slurry on a collector. To exhibit good conductivity, the sulfur compound and the conductive agent should be uniformly distributed in the solvent. However, it is easy to prepare a slurry in which the sulfur compound and the conductive agent do not disperse uniformly. This non-uniformity causes the deterioration of the conductivity of the resulting positive electrode and requires a larger amount of the conductive agent than an amount otherwise necessary. The increased amount of the conductive agent requires a larger amount of the binder than otherwise required due to the large specific surface area of the conductive agent. Consequently, the amount of the positive active material decreases relatively in the slurry, thereby reducing capacity. In addition, even though a large amount of the conductive agent is used, the positive electrode has poor charge and discharge characteristics.

SUMMARY OF THE INVENTION

It is an object of the present invention to provide a positive active material for a lithium-sulfur battery that provides a positive electrode exhibiting good conductivity.

It is another object to provide a positive active material for a lithium-sulfur battery that provides a positive electrode exhibiting a high capacity by increasing a relative amount of the positive active material in a positive active material composition.

It is still another object to provide a positive active material composition for a lithium-sulfur battery including the positive active material.

It is still another object to provide a method of preparing a positive active material composition including the same.

Additional objects and advantages of the invention will be set forth in part in the description which follows and, in part, will be obvious from the description, or may be learned by practice of the invention.

In order to achieve these and other objects, an embodiment of the present invention provides a positive active material for a lithium-sulfur battery including a sulfur compound, a conductive agent adhered to the sulfur compound, and a binder including at least one polymer.

A positive active material composition according to another embodiment of the invention includes a positive active material comprising a sulfur compound, a conductive agent adhered to a sulfur compound, a first binder, a second binder, and an organic solvent.

According to a further embodiment of the present invention, a method of preparing a positive active material composition for a lithium-sulfur battery includes mixing a sulfur compound, a conductive agent, and at least one first binder in a first organic solvent, drying the mixture to prepare a positive active material, and mixing the positive active material, a second binder, and a second organic solvent.

BRIEF DESCRIPTION OF THE DRAWINGS

A more complete appreciation of the invention, and many of the attendant advantages thereof, will be readily apparent as the same becomes better understood by reference to the following detailed description of embodiments when considered in conjunction with the accompanying drawings, wherein.

DETAILED DESCRIPTION OF THE EMBODIMENTS

Figure 1:
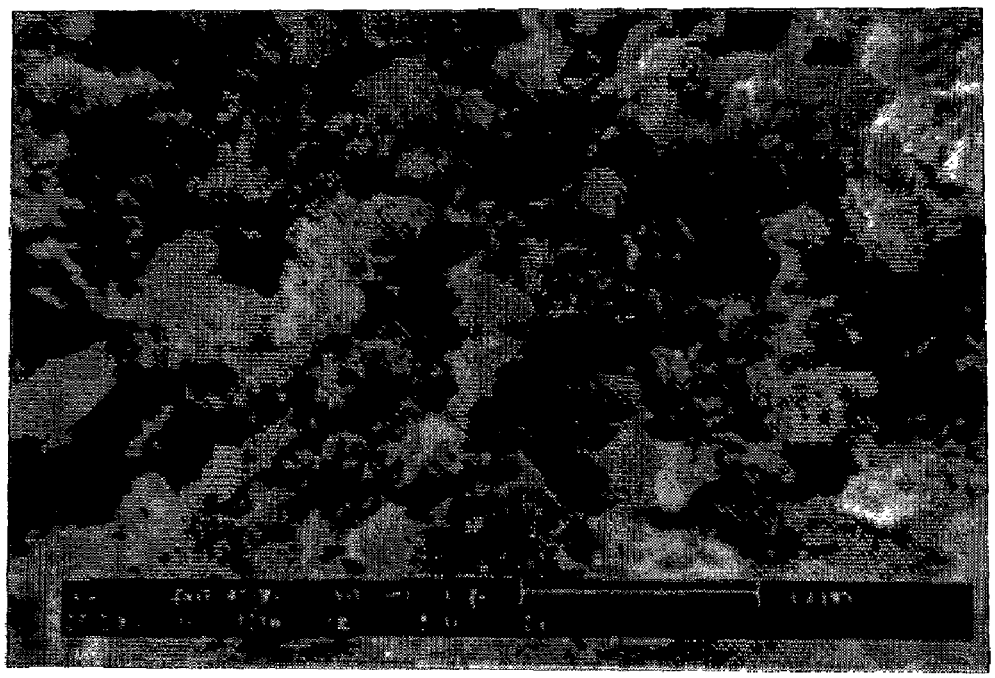
FIG. 1 is a 3000-fold-enlarged SEM (Scanning Electron Microscope) photograph showing a positive electrode using a positive active material of Comparative Example 1.

In the following detailed description, the embodiments of the invention are shown and described simply by way of illustration of modes contemplated by the inventors of carrying out the invention. As will be realized, the invention is capable of modification in various obvious respects, all without departing from the invention. Accordingly, the drawings, specific examples, and description are to be regarded as illustrative in nature, and not restrictive.

A positive active material for a lithium-sulfur battery of the present invention includes a sulfur compound, a conductive agent adhered to the sulfur compound, and a binder that acts to adhere the conductive agent to the sulfur compound. In the positive active material of the present invention, the conductive agent is previously and uniformly adhered to the sulfur compound prior to the production of the slurry, thereby improving conductivity, thus decreasing the amount of the conductive agent as compared to an amount required using the conventional techniques. Consequently, the amount of positive active material in the slurry can be relatively larger than the conventional techniques, thereby increasing capacity.

The sulfur compound is any sulfur compound in which an electrochemical reaction occurs. According to embodiments of the invention, the sulfur compound includes one or more selected from elemental sulfur ($S_8$), $Li_2S_n$ ($n \geq 1$), organic sulfur compound, or carbon-sulfur polymer (($C_2S_x)_n$, where x ranges from 2.5 to 50, and $n \geq 2$).

The conductive agent facilitates the movement of electrons within a positive electrode. According to embodiments of the invention, the conductive agent includes a carbon-based compound such as carbon black, acetylene black, and furnace black, a metal powder, or a mixture thereof.

The binder helps the conductive agent to adhere to the sulfur compound as if the sulfur compound is coated with the conductive agent. According to an embodiment of the invention, the binder is one or more polymers selected from polyethylene oxide, polyvinylidene fluoride, a copolymer of polyvinylidene fluoride and polyhexafluoropropylene, poly(vinylacetate), poly(vinyl butyral-co-vinylalcohol-co-vinyl acetate), poly(methylmethacrylate-co-ethyl acrylate), polyacrylonitrile, polyvinylchloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, or sulfonated styrene/ethylene-butadiene/styrene triblock polymer.

Hereinafter, a method of preparing the positive active material for a lithium-sulfur battery of an embodiment of the present invention is described in detail.

A sulfur compound, a conductive agent, and a first binder are mixed in a first organic solvent, and the mixture is dried to prepare a positive active material. The positive active material is mixed with a second binder in a second solvent to prepare a positive active material composition (i.e., a slurry). The first binder and the second binder of the positive active material composition are mixed in a weight ratio of 1:99 to 80:20 according to an embodiment of the invention.

When the weight ratio of the first binder is smaller than 1, the amount of the first binder is too small to affect the adherence of the conductive agent to the sulfur compound. When the weight ratio of the first binder is greater than 80, the amount of the second binder decreases relatively, and it is difficult to adhere the positive active material composition to a current collector.

The first binder helps the conductive agent to adhere to the sulfur compound, as if the sulfur compound is coated with the conductive agent. The second binder enhances the mechanical integrity of a positive electrode and adheres an active mass to the current collector. In the present invention, the active mass refers to a material obtained by coating the positive active material composition on the current collector and drying the coated positive active material composition to remove the solvent. The dried and coated positive active material composition includes the positive active material, the binder, and the conductive agent.

According to an embodiment of the invention, the first and second binders have different solubilities to the first and the second solvents. In other words, the first binder is soluble in the first solvent, but is slightly soluble in the second solvent. The second binder is soluble in the second solvent, but is slightly soluble in the first solvent.

The first and the second binders are one or more polymers and are independently selected from the group consisting of polyvinylidene fluoride, a copolymer of polyvinylidene fluoride and polyhexafluoropropylene, poly(vinylacetate), poly(vinyl butyral-co-vinyl alcohol-co-vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, and sulfonated styrene/ethylene-butadiene/styrene triblock polymer.

Figure 14:
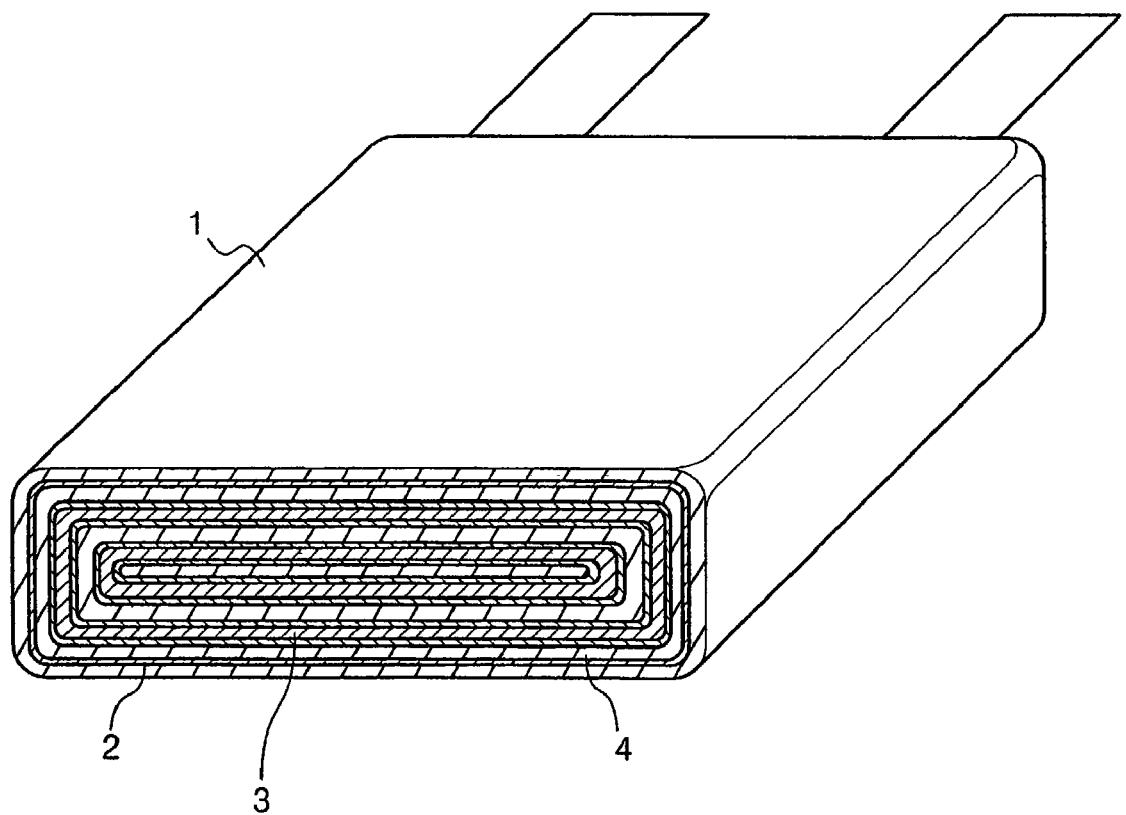
FIG. 14 shows a lithium-sulfur battery according to an embodiment of the present invention.

The positive active material composition is coated on the current collector to prepare a positive electrode 3 for use in a lithium-sulfur battery shown in FIG. 14 according to an embodiment of the present invention. The lithium-sulfur battery includes a case 1 containing the positive electrode 3, a negative electrode 4, and a separator 2 interposed between the positive electrode 3 and the negative electrode 4.

The current collector can be any material used in electrodes. According to an embodiment of the invention, the current collector is a conductive material such as stainless steel, aluminum, copper or titanium. It is preferable to use a carbon-coated aluminum current collector. The carbon-coated aluminum current collector has excellent adhesive properties with regard to the coated layer including the positive materials, shows a lower contact resistance, and inhibits corrosion by polysulfide as compared with a bare aluminum current collector.

The negative electrode 4 includes a negative active material selected from materials in which lithium intercalation reversibly occurs, materials capable of forming a compound with a lithium metal lithium alloy or a lithium metal according to embodiments of the invention. The lithium alloy includes lithium/aluminum alloy, or lithium/tin alloy.

The materials in which lithium intercalation reversibly occurs are carbon-based compounds according to an embodiment of the invention. Any carbon materials may be used as long as they are capable of intercalating and deintercalating lithium ions. Examples of the carbon material include crystalline carbon, amorphous carbon, or a mixture thereof.

The materials capable of forming a compound with lithium metal include titanium nitrate, $SnO_2$, and Si according to an embodiment of the invention. However, it is understood that other materials may be used.

An electrolyte used in the lithium-sulfur battery with the positive and negative electrodes 3, 4 includes an organic solvent and an electrolytic salt. The organic solvent includes one or more solvents selected from the group consisting of benzene, fluorobenzene, toluene, N,N-dimethylformamide, dimethylacetate, trifluorotoluene, xylene, cyclohexane, tetrahydrofurane, 2-methyltetrahydrofurane, cyclohexanone, ethanol, isopropyl alcohol, dimethyl carbonate, ethylmethyl carbonate, methylpropyl carbonate, methylpropionate, ethylpropionate, methyl acetate, ethyl acetate, propyl acetate, dimethoxy ethane, 1,3-dioxolan, diglyme, tetraglyme, ethyl carbonate, propyl carbonate, γ-butyrolactone, and sulfolane. The electrolytic salt includes lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$), lithium bis(trifluoromethyl)sulfonimide ($LiN(SO_2CF_3)_2$), and lithium bis(perfluoroethylsulfonyl)imide ($LiN(SO_2)C_2F_5)_2$). However, it is understood that other electrolytes can be used.

The separator 2 for the lithium-sulfur battery includes a polymer film such as polyethylene and polypropylene, and a multi-layered film of polyethylene and polypropylene.

The present invention will be explained in more detail with reference to the following Examples and Comparative Examples. However, it is understood that the Examples are to illustrate embodiments of the present invention, and that the present invention is not limited to these Examples.

COMPARATIVE EXAMPLE 1

60 wt % of active sulfur powder, 20 wt % of Ketjen black as a conductive agent, and 20 wt % of polyvinylpyrrolidone as a binder were mixed in isopropyl alcohol to prepare a slurry. The slurry was coated on a Rexam (carbon-coated Al-foil) collector with a doctor blade to prepare a positive electrode. Using the positive electrode and a lithium metal electrode, a pouch cell was fabricated.

FIG. 1 shows a 3000-fold-enlarged SEM (Scanning Electron Microscope) photograph of a positive active material according to Comparative Example 1. As shown in FIG. 1, a great mass of sulfur appears, and a few lumps of conductive agent are located within the sulfur mass.

EXAMPLE 1

75 wt % of active sulfur powder and 15 wt % of Ketjen black were ball-milled in a polyethylene oxide/acetonitrile solution, dried, and ground with a mortar to prepare a positive active material powder. The amount of the used polyethylene oxide was 2 wt %.

9.2 g of the positive active material powder was added to 0.8 g of polyvinyl pyrrolidone and mixed together in isopropyl alcohol while stirring for 48 hours or more to prepare a slurry. The slurry was coated on a Rexam collector with a doctor blade to prepare a positive electrode. Using the positive electrode and a lithium metal electrode, a pouch cell was fabricated.

Figure 2:
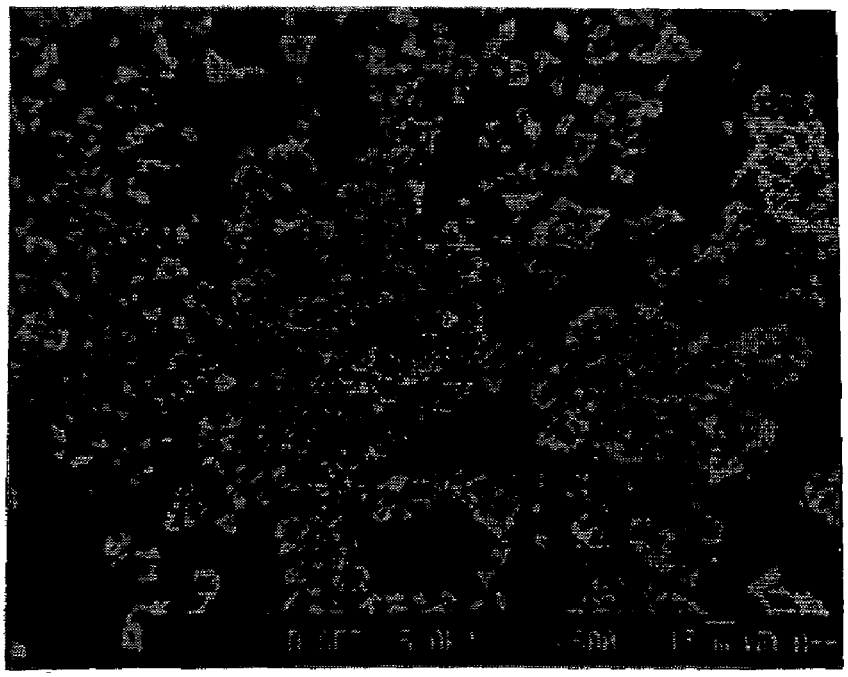
FIG. 2 is a 5-fold-enlarged SEM photograph showing a positive electrode using a positive active material of Example 1 of an embodiment of the present invention.
Figure 3:
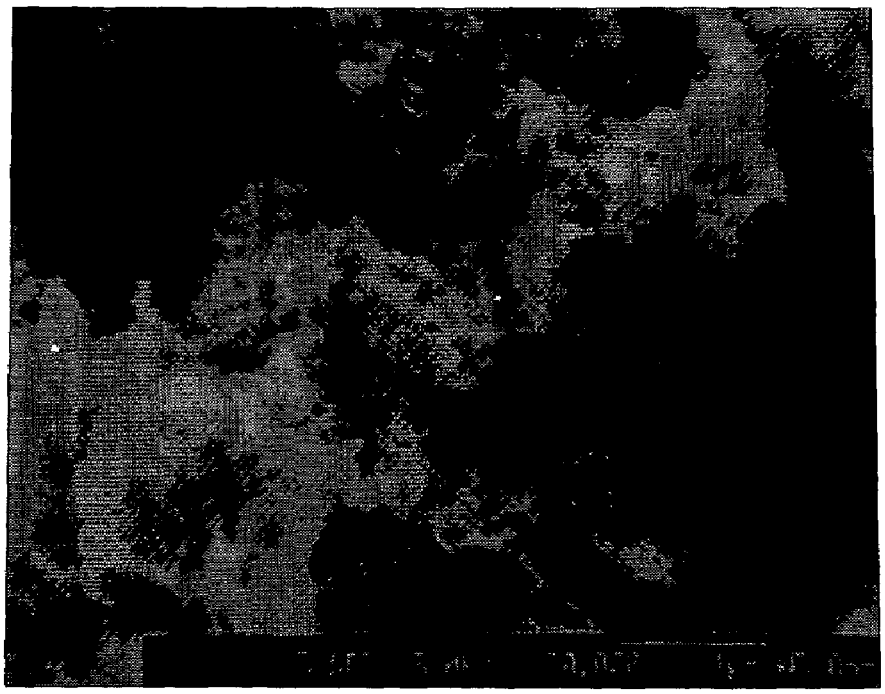
FIG. 3 is a 20000-fold-enlarged SEM photograph showing a positive electrode using a positive active material of Example 1 of an embodiment of the present invention.
Figure 4:
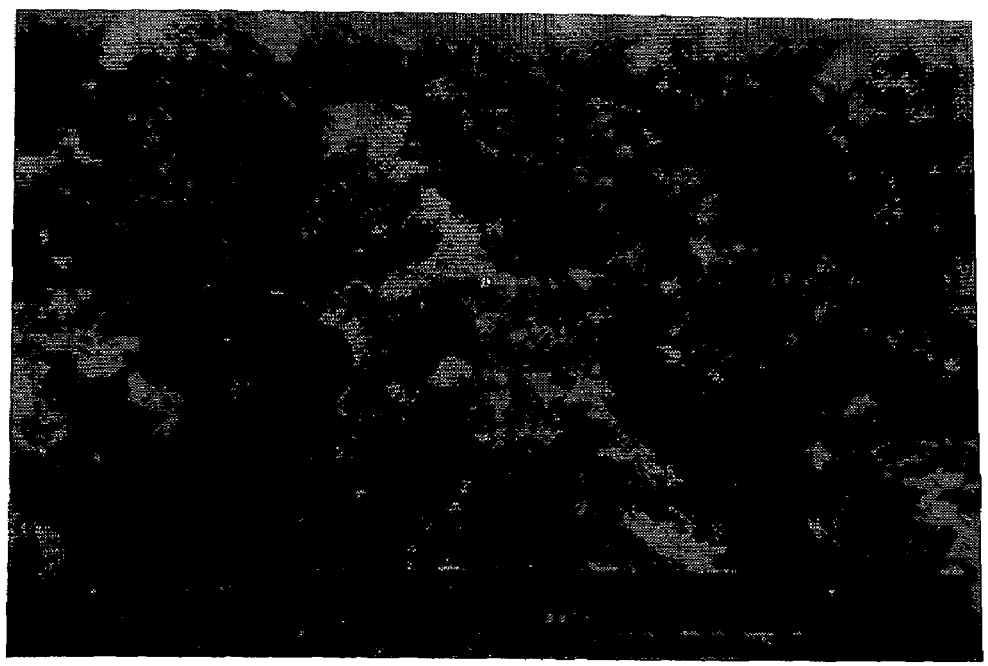
FIG. 4 is a 3000-fold-enlarged SEM photograph showing a positive active electrode using a positive active material of Example 1 of an embodiment of the present invention.

FIGS. 2 to 4 respectively show a 5-fold-enlarged SEM photograph, a 20000-fold-enlarged SEM photograph, and a 3000-fold-enlarged SEM photograph of a positive active material according to Example 1. As shown in FIGS. 2 to 4, sulfur masses do not appear, and fine particles are dispersed.

EXAMPLE 2

75 wt % of active sulfur powder and 15 wt % of Ketjen black were ball-milled in a polyethylene oxide/acetonitrile solution, dried, and ground with a mortar to prepare a positive active material powder. The amount of the polyethylene oxide was 2 wt %.

9.2 g of the positive active material powder was added to 0.8 g of polyvinyl pyrrolidone and mixed together in isopropyl alcohol while stirring for 48 hours or more to prepare a slurry. The slurry was coated on a Rexam collector by a doctor blade to prepare a positive electrode. Using the positive electrode and a lithium metal electrode, a pouch cell was fabricated.

Figure 5:
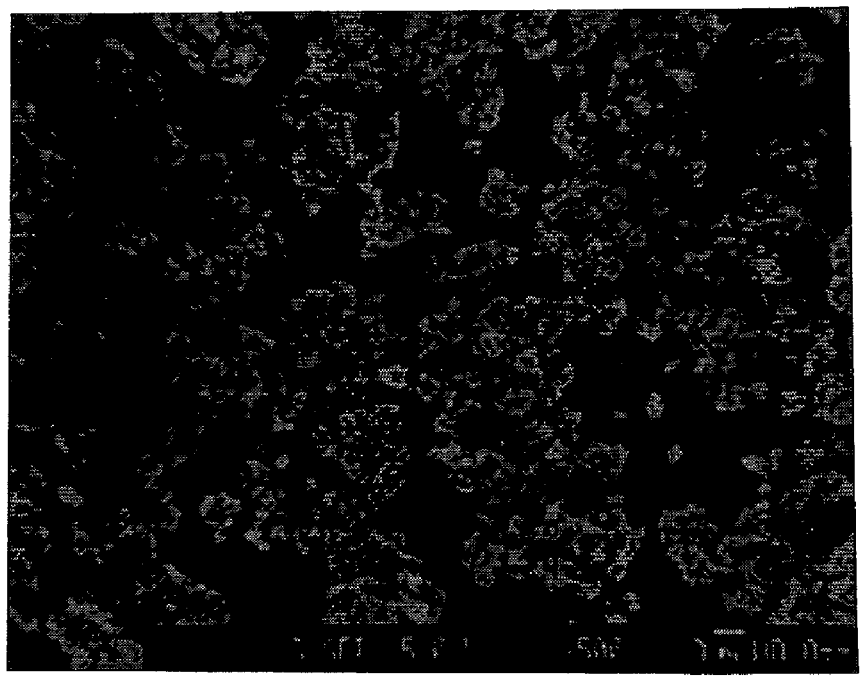
FIG. 5 is 5-fold-enlarged SEM photograph showing a positive active electrode using a positive active material of Example 2 of an embodiment of the present invention.
Figure 6:
FIG. 6 is 20000-fold-enlarged SEM photograph showing a positive active electrode using a positive active material of Example 2 of an embodiment of the present invention.

FIG. 5 shows a SEM photograph of a positive active material according to Example 2, and FIG. 6 shows the SEM photograph magnified 100-fold from that of FIG. 5. As shown in FIGS. 5 and 6, sulfur masses do not appear, and fine particles are dispersed.

Figure 7:
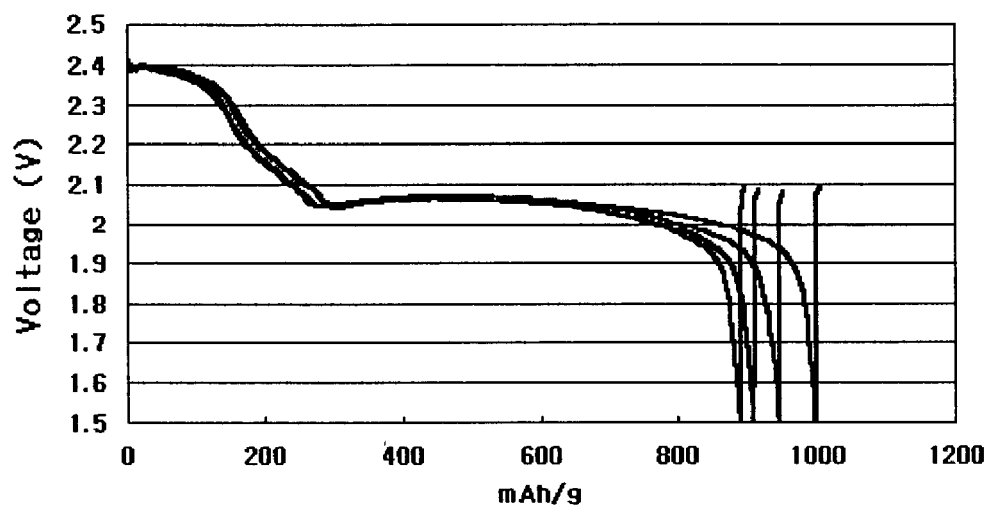
FIG. 7 is a graph showing discharge capacity per sulfur weight of a battery including a positive active material of Comparative Example 1.
Figure 8:
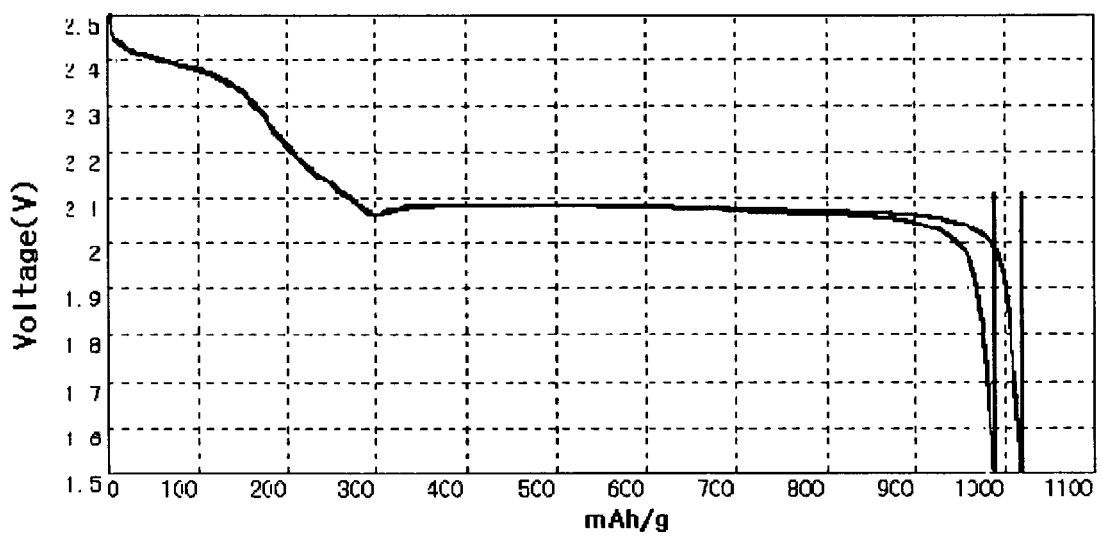
FIG. 8 is a graph showing discharge capacity per sulfur weight of a battery including a positive active material of Example 1 of an embodiment of the present invention.
Figure 9:
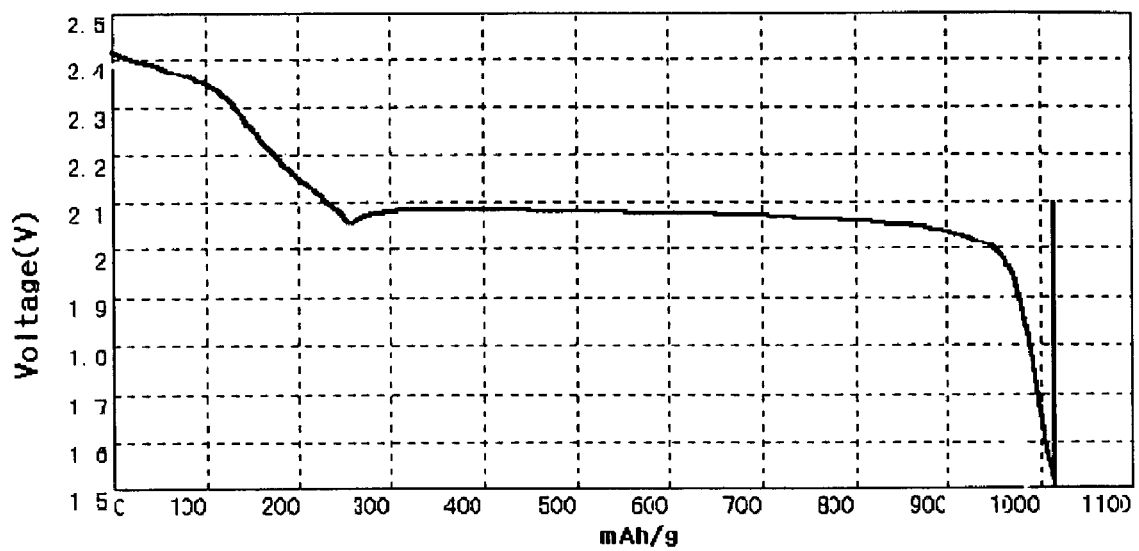
FIG. 9 is a graph showing discharge capacity per sulfur weight of a battery including a positive active material of Example 2 of an embodiment of the present invention.
Figure 10:
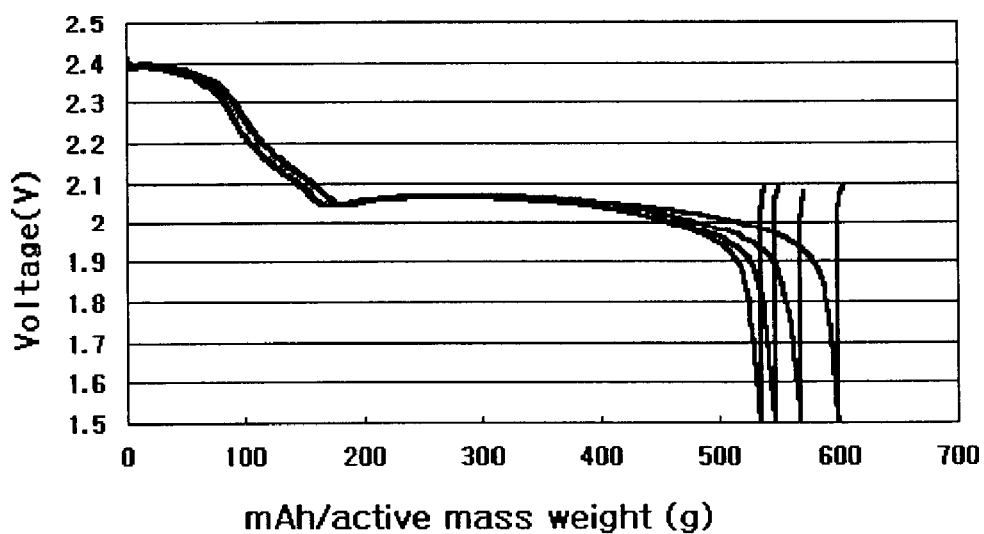
FIG. 10 is a graph showing discharge capacity per total weight of active mass of a battery including a positive active material of Comparative Example 1.
Figure 11:
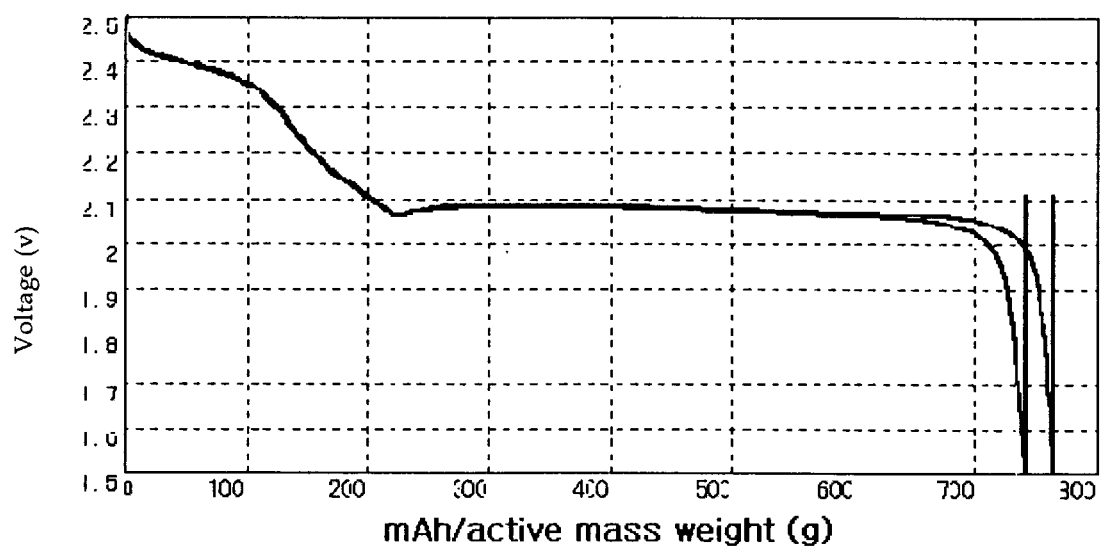
FIG. 11 is a graph showing discharge capacity per sulfur weigh of active mass of a battery including a positive active material of Example 1 of an embodiment of the present invention.
Figure 12:
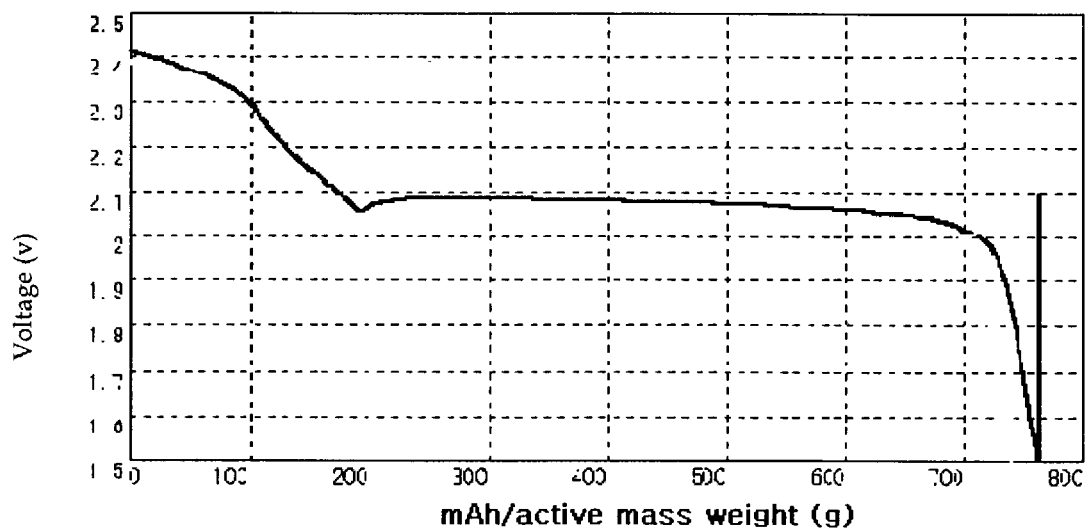
FIG. 12 is a graph showing discharge capacity per sulfur weight of active mass of a battery including a positive active material of Example 2 of an embodiment of the present invention.

The pouch cells of Examples 1 and 2 and Comparative Example 1 were charged, and their capacity per sulfur weight, and the capacity per active mass weight were respectively measured. The capacity per sulfur weight of Comparative Example 1, Example 1, and Example 2 are respectively represented in FIGS. 7 to 9. The capacity per active mass weight of Comparative Example 1, Example 1, and Example 2 are respectively represented in FIGS. 10 to 12.

As shown in FIGS. 7 to 12, the capacity per sulfur weight and that per active mass weight of Comparative Example 1 respectively range from 900 to 1000 mAh/g, and from 550 to 600 mAh/g; the capacity per sulfur weight and that per active mass weight of Example 1 respectively reach 1000 mAh/g, and 750 mAh/g, and the capacity per sulfur weight and that per active mass weight of Example 2 respectively reach 1000 mAh/g, and 750 mAh/g.

The capacity per sulfur weight of Examples 1 and 2 is similar to that of Comparative Example 1, and the capacity per active mass weight of Examples 1 and 2 is higher than that of Comparative Example 1. It is suggested that the results occur because the amount of sulfur compound of Examples 1 and 2 is relatively greater than that of Comparative Example 1.

Figure 13:
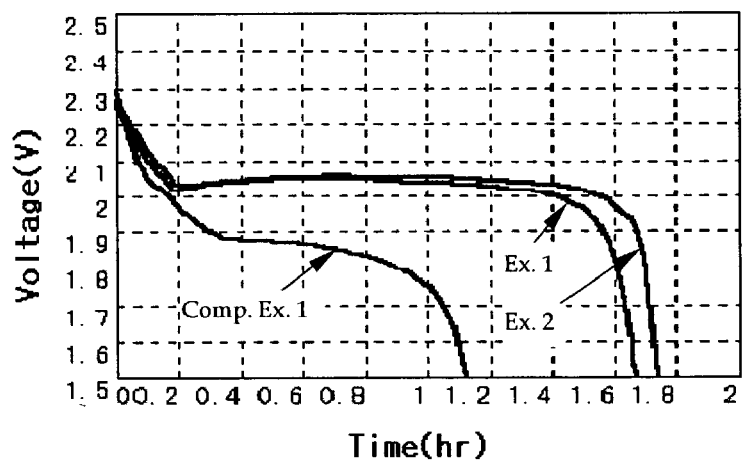
FIG. 13 is a graph showing discharge voltage of positive active materials of Examples 1 and 2 of an embodiment of the present invention and Comparative Example 1 during charging and discharging at 0.5 C, according to time.

In addition, FIG. 13 shows each discharge voltage of cells made according to Comparative Example 1, and Examples 1 and 2 during charging and discharging at 0.5 C. As shown in FIG. 13, the cells of Examples 1 and 2 have a discharge voltage and a discharge capacity higher than that of Comparative Example 1.

Therefore, the capacity per active mass weight of the positive active material increases by 25 to 35%, and the positive active material has improved discharge potentials and discharge capacity at high rate.

While the present invention has been described in detail with reference to the preferred embodiments, those skilled in the art will appreciate that various modifications and substitutions can be made thereto without departing from the spirit and scope of the present invention as set forth in the accompanying claims and equivalents thereof.

What is claimed is:

1. A positive electrode for a lithium-sulfur battery comprising:
   a current collector; and
   a positive active material comprising:
      a sulfur compound;
      a conductive agent adhered to said sulfur compound; and a binder comprising first and second binders and at least one polymer included in at least one of the first and second binders, where one of the first and second binders binds said conductive agent to said sulfur compound and the other one of the first and second binders is usable to bind the positive active material to the current collector for the lithium-sulfur battery, wherein said at least one polymer is selected from the group consisting of polyvinylidene fluoride, a copolymer of polyvinylidene fluoride and polyhexafluoropropylene, poly(vinylacetate), poly(vinyl butyral-co-vinyl alcohol-co-vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, and sulfonated styrene/ethylene-butadiene/styrene triblock polymer.

2. The positive electrode according to claim 1, wherein said sulfur compound comprises one or more compounds selected from the group consisting of elemental sulfur ($S_8$), $Li_2S_n$ ($n \geq 1$), organic sulfur compound, and carbon-sulfur polymer (($C_2S_x$)$_n$, wherein x ranges from 2.5 to 50, and $n \geq 2$).

3. A method of preparing the positive active material of claim 1 for the lithium-sulfur battery, comprising:
   mixing the sulfur compound, the conductive agent, and the first binder in a first solvent;
   drying the mixture to prepare the positive active material; and
   mixing the positive active material and the second binder in a second solvent.

4. The method according to claim 3, wherein the sulfur compound is one or more compounds selected from the group consisting of elemental sulfur ($S_8$), $Li_2S_n$ ($n \geq 1$), organic sulfur compound, and carbon-sulfur polymer (($C_2S_x$)$_n$, wherein x ranges from 2.5 to 50, and $n \geq 2$).

5. The method according to claim 3, wherein the first binder and the second binder are different materials, and each material is at least one selected from the group consisting polyvinylidene fluoride, a copolymer of polyvinylidene fluoride and polyhexafluoropropylene, poly(vinylacetate), poly(vinyl butyral-co-vinyl alcohol-co-vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, and sulfonated styrene/ethylene-butadiene/styrene triblock polymer, and
   the first binder and the second binder have respectively different solubilities to the first solvent and the second solvent.

6. The method according to claim 3, wherein the first binder is soluble in the first solvent, the second binder is less soluble in the first solvent than the first binder, the second binder is soluble in the second solvent, and the first binder is less soluble in the second solvent than the second binder.

7. The method according to claim 3, wherein the conductive agent is selected from the group consisting of a carbon-based material, a carbon-based compound, a metal powder, and a metallic compound.

8. The method according to claim 3, wherein a weight ratio of the first binder to the second binder is 1:99 or greater.

9. The method according to claim 8, wherein the weight ratio of the first binder to the second binder is 80:20 or less.

10. A positive active material composition for a lithium-sulfur battery, comprising:
    a positive active material comprising a sulfur compound;
    a conductive agent adhered to the sulfur compound;
    a first binder comprising at least one polymer and that binds said conductive agent to the sulfur compound;
    a second binder usable to adhere said positive active material to a current collector; and
    an organic solvent, wherein said first binder is polyethylene oxide or polyvinyl acetate, and said second binder is polyvinyl pyrrolidone.

11. The positive active material composition according to claim 10, wherein the sulfur compound is one or more compounds selected from the group consisting of elemental sulfur ($S_8$), $Li_2S_n$ ($n \geq 1$), organic sulfur compound, and carbon-sulfur polymer (($C_2S_x$)$_n$, wherein x ranges from 2.5 to 50, and $n \geq 2$).

12. A method of preparing the positive active material composition of claim 10 for the lithium-sulfur battery, comprising:
    mixing the sulfur compound, the conductive agent, and the first binder in a first organic solvent to prepare a first mixture, the first solvent comprising acetonitrile and the first binder being selected from the group consisting of polyethylene oxide or polyvinyl acetate;
    drying the first mixture to prepare the positive active material; and
    mixing the positive active material with polyvinyl pyrrolidone as the second binder in a second organic solvent including the organic solvent, the second organic solvent comprising isopropyl alcohol.

13. The method according to claim 12, wherein the sulfur compound is one or more compounds selected from the group consisting of elemental sulfur ($S_8$), $Li_2S_n$ ($n \geq 1$), organic sulfur compound, and carbon-sulfur polymer (($C_2S_n$)$_x$, wherein x ranges from 2.5 to 50, and $n \geq 2$).

14. A lithium-sulfur battery, comprising:
    a positive electrode comprising a positive active material, the positive active material comprising a sulfur compound, a conductive agent, and a binder which binds the conductive agent to the sulfur compound;
    a negative electrode comprising a negative active material; and
    an electrolyte disposed between said positive and negative electrodes,
    wherein the positive active material is made by:
      mixing the sulfur compound, the conductive agent, and the binder in a first solvent; and
      drying the mixture to prepare the positive active material and, wherein said binder is two or more polymers selected from the group consisting of polyethylene oxide, polyvinylidene fluoride, a copolymer of polyvinylidene fluoride and polyhexafluoropropylene, poly(vinylacetate), poly(vinyl butyral-co-vinylalcohol-co-vinyl acetate), poly(methylmethacrylate-co-ethyl acrylate), polyacrylonitrile, polyvinylchloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, or sulfonated styrene/ethylene-butadiene/styrene triblock polymer.

15. The lithium-sulfur battery according to claim 14, wherein said positive electrode further comprises a current collector, and the positive active material is adhered to the current collector by mixing the positive active material and a second binder in a second solvent to prepare a slurry, coating the slurry on the current collector, and drying the coated current collector.

16. A positive active material composition for a lithium-sulfur battery, comprising:
 a positive active material comprising a sulfur compound;
 a conductive agent; and
 a binder,
  wherein said binder is two or more polymers selected from the group consisting of polyethylene oxide, polyvinylidene fluoride, a copolymer of polyvinylidene fluoride and polyhexafluoropropylene, poly(vinylacetate), poly(vinyl butyral-co-vinylalcohol-co-vinyl acetate), poly(methylmethacrylate-co-ethyl acrylate), polyacrylonitrile, polyvinylchloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, or sulfonated styrene/ethylene-butadiene/styrene triblock polymer.

* * * * *

UNITED STATES PATENT AND TRADEMARK OFFICE
CERTIFICATE OF CORRECTION

PATENT NO.        : 7,018,739 B2
APPLICATION NO. : 10/156796
DATED             : March 28, 2006
INVENTOR(S)       : Jae-Woan Lee et al.

It is certified that error appears in the above-identified patent and that said Letters Patent is hereby corrected as shown below:

Title page, col. 2;
Please replace the Abstract in its entirety with the Abstract as filed, below.

-- A positive active material includes a sulfur compound, a conductive agent adhered to the sulfur compound, and a binder including at least one polymer to bind the conductive agent to the sulfur compound.--

Column 8, line 40, change "$((C_2S_n)_x$" to --$((C_2S_x)_n$--.

Signed and Sealed this

Sixth Day of March, 2007

JON W. DUDAS
*Director of the United States Patent and Trademark Office*